United States Patent
Schol

(10) Patent No.: US 6,178,228 B1
(45) Date of Patent: Jan. 23, 2001

(54) APPARATUS HAVING A NUMBER OF OPERATING PARAMETERS THAT CAN BE SET BY AN ATTENDANT VIA A CONTROL UNIT

(75) Inventor: Amy Gretchen Schol, Dormitz (DE)

(73) Assignee: Siemens Aktiengesellschaft, Munich (DE)

(*) Notice: Under 35 U.S.C. 154(b), the term of this patent shall be extended for 0 days.

(21) Appl. No.: 09/265,234

(22) Filed: Mar. 8, 1999

(30) Foreign Application Priority Data

Mar. 9, 1998 (DE) .............................. 198 10 069

(51) Int. Cl.[7] .................................... H05G 1/28
(52) U.S. Cl. ................ 378/162; 378/8; 378/62; 345/1; 345/156; 345/326
(58) Field of Search ................ 378/162, 8, 62; 345/1, 156, 326

(56) References Cited

U.S. PATENT DOCUMENTS 5,090,040 * 2/1992 Lanza et al. .............................. 378/62
5,790,114 * 8/1998 Geaghan et al. ...................... 346/326

FOREIGN PATENT DOCUMENTS 0 690 226 3/1996 (EP).
WO 97/15840 3/1998 (WO).

OTHER PUBLICATIONS

"Graphical Interfaces for Network Operations and Management," Cunningham et al., AT&T Technical Journal, May/Jun. 1993, pp. 57–66.

* cited by examiner

Primary Examiner—David V. Bruce
Assistant Examiner—Pamela R. Hobden
(74) Attorney, Agent, or Firm—Schiff Hardin & Waite

(57) ABSTRACT

An apparatus has a number of operating parameters that can be set by an attendant via a control unit. The control unit has a display on which a mark indicating and influencing the value of the appertaining operating parameter on a scale can be displaced for at least two operating parameters with an input means. The scales are thereby divided into ranges indicating the admissibility and the inadmissibility of the corresponding values of the respective operating parameters and the shift of the mark belonging to one operating parameter effects, as required, a modification of the subdivision of at least one other scale.

20 Claims, 4 Drawing Sheets

APPARATUS HAVING A NUMBER OF OPERATING PARAMETERS THAT CAN BE SET BY AN ATTENDANT VIA A CONTROL UNIT

BACKGROUND OF THE INVENTION

1. Field of the Invention

The present invention is directed to an apparatus having a number of operating parameters that can be set by an attendant via a control unit, of the type wherein the control unit has a display on which a mark, that indicates and influences the value of the appertaining operating parameter, can be displaced on a scale with an input means.

2. Description of the Prior Art

In an ideal apparatus, all operating parameters can be selected independently of one another. The entire range of adjustment thus always can be selected for each operating parameter. In reality, however, certain operating parameter values are often dependent on other values of other operating parameters that have already been determined in advance or that are conditioned by the status of the apparatus. The goal of the attendant is to find a combination of operating parameters for a desired operating condition that comes as close to possible as the ideal set of operating parameters.

Although it would be possible to present the operating parameters in table format on the display. A table, however, does not show how far the attendant is away from the targeted idea. The dynamic reaction of the apparatus to changes of operating parameters also cannot be satisfactorily recognized in a table format. The apparatus can either output a message, for example via a display, that the selected combination of operating parameters is not allowed, or the apparatus can automatically modify other operating parameters that may also already have been set by the attendant. In the former instance, the attendant must find an allowable combination of operating parameters based only on the table, this being time-consuming and uncomfortable. In the latter instance, the unpleasant situation for the attendant arises, namely that the apparatus ultimately prescribes the sequence in which the operating parameters must be set for the attendant.

There would also be the possibility of fashioning the control unit such that an automatic optimization of the operating parameters ensues following the input of a desired but inadmissible combination of operating parameters. The apparatus can then find the extremes of a function in n operating parameters and set them. However, the situation is often such that an operating parameter is extremely important to the attendant and should therefore not be modified insofar as possible. In the case of an automatic optimization, the attendant must be able to input (identify) what operating parameters must not be modified into the apparatus. The selection of the value of the operating parameter which is not to be modified is ultimately only possible on the basis of trial and error, since the apparatus can only determine, based on the setting of this value, whether an optimization of the other operating parameters is possible at all. Moreover, it is questionable whether the values determined by optimization will agree with the attendant's preferences.

SUMMARY OF THE INVENTION

An object of the present invention is to provide an apparatus of the type initially described wherein the setting of impermissible combinations of operating parameters is prevented, but the attendant is assisted in the setting of operating parameters that are allowed and approach closely to the actual operating parameters desired by the attendant.

This object is inventively achieved in an apparatus having a number of operating parameters adjustable by an attendant via a control unit, whereby the control unit having a display on which a mark indicating and influencing the value of the appertaining operating parameter can be displaced on a scale for at least two operating parameters with an input means, wherein the scales are divided into ranges indicating the admissibility and the inadmissibility of the corresponding values of the respective operating parameter, and the displacement of the mark representing an operating parameter on one scale can effect a modification on at least one other scale, as required, of the subdivision into the ranges indicating the admissibility and inadmissibility of values of the operating parameter represented on the other scale.

In the invention, thus, the setting of unallowed combinations of operating parameters is opposed, but those combinations of operating parameters that are allowed are shown to the attendant at the same time in a graphic and therefore easily comprehended way, namely without losing the target ideas of the attendant from sight. It is thus simple and easily possible for an attendant to optimally set the operating parameters of the inventive apparatus corresponding to the attendant's ideas, because two points of view are simultaneously presented: what the attendant would like to set and what the apparatus can offer.

In the invention, the attendant always sees how far he or she is removed from an allowable combination of operating parameters. An automatic modification of operating parameters by the apparatus is not required in the invention since the attendant can immediately see whether his or her targeted idea is possible or not. Moreover, the selection of the value of an especially critical operating parameter is facilitated for the attendant in an elegant way since the attendant can immediately see what operating parameters must be modified least.

A scale can be constructed such that the upper and/or lower limit value of the respective operating parameter displayed by it's dependence on the position of the appertaining mark. The scale then illustrates a value range of the respective operating parameter that lies between the apparatus-dependent, absolute upper and absolute lower limit values of the respective operating parameter. The limit values belonging to a specific position of the mark thus must be respectively re-calculated when the mark is displaced. Since such a structure of the scales can be confusing for an attendant, it is normally advantageous when the upper and lower limit value of a scale is independent of the position of the corresponding mark, and thus corresponds to the absolute upper and absolute lower limit value of the corresponding operating parameter.

In this case, the $m^{th}$ scale that represents the operating parameter $p_m$ is calculated according to $$\min(p_m) \leq \text{scale}_m \leq \max(p_m).$$

The upper and lower limit values $f_{nj,max}$ and $f_{nj,min}$ that limit the colored areas $CB_{nj}$ within the scales are dependent on the other, currently set operating parameters $p_i$. Valid for the $j^{th}$ color of the $m^{th}$ (of n, n>2) scales is:

$$f_{nj,min}(p_1, p_2, p_{m-1}, p_{m+1}, \ldots, p_n) \leq CB_{nj} \leq f_{nj,max}(p_1, p_2, p_{m-1}, p_{m+1}, \ldots, p_n)$$

The $p_i$ values are determined by the mark belonging to the respective scale.

All colors are recalculated when a $p_i$ value is modified. The positions of the other, black marks (except the one that was displaced by the attendant) are not modified.

In instances wherein the admissibility or inadmissibility of the value of an operating parameter is not dependent on unambiguously defined, physical boundary conditions, the corresponding scale, in an embodiment of the invention, can contain a range identifying the apparatus-dependent admissibility of a value of the operating parameter.

In another embodiment of the invention the apparatus has an operating element which is actuated to set the values of the operating parameters which are preselected with the marks, insofar as none of the preselected values lies in an inadmissible range. Thus only a pre-selection of the values of the operating parameters initially ensues with the marks, and the actual setting of the values of the operating parameters and thus the operation of the apparatus with these operating parameters only becomes possible when a further operating element is actuated. It is assured in this way that the apparatus cannot be mistakenly operated with inadmissible values of the operating parameters.

The scales can be fashioned bar-like, the admissible, inadmissible and potentially conditionally admissible ranges are indicated by different chromatic and/or grey-scale values, and the mark is formed by a line proceeding transversely to the longitudinal axis of the scale. This satisfies all prerequisites for an easy adjustability of the changing values of the operating parameters and, at the same time, for a good recognition of the admissibility, inadmissibility, and possibly conditional admissibility, of the set values of the operating parameters. As needed, a scaling by graduated ones can be allocated to the scales.

In further version of the invention a table is stored in the control unit wherein the admissible, inadmissible and possibly conditionally admissible values of all other operating parameters are stored for the adjustable values of at least one of the operating parameters, and the control unit sets the ranges on the scales with reference to the table, taking the set positions of the marks into consideration. The values contained in the table can be acquired by calculation or empirically.

Alternatively, the control unit, for the adjustable values of at least one operating parameter, can calculate the admissible, inadmissible and possibly conditionally admissible values of all other operating parameters, possibly upon consultation of the values of at least one further parameter characterizing the current operating condition of the apparatus. The control unit then sets the ranges on the scales taking the set positions of the marks into consideration.

It is also possible to employ a table for some of the operating parameters and to employ calculations for some of the remaining operating parameters.

The apparatus is preferably a medical device and, in particular, a device containing an x-ray tube such as a computed tomography (CT) apparatus or an x-ray angiography apparatus, wherein the waiting before the beginning of exposure, the tube current of the x-ray tube and the duration of the x-ray emission can be set as operating parameters.

DESCRIPTION OF THE PREFERRED EMBODIMENTS

Figure 1:
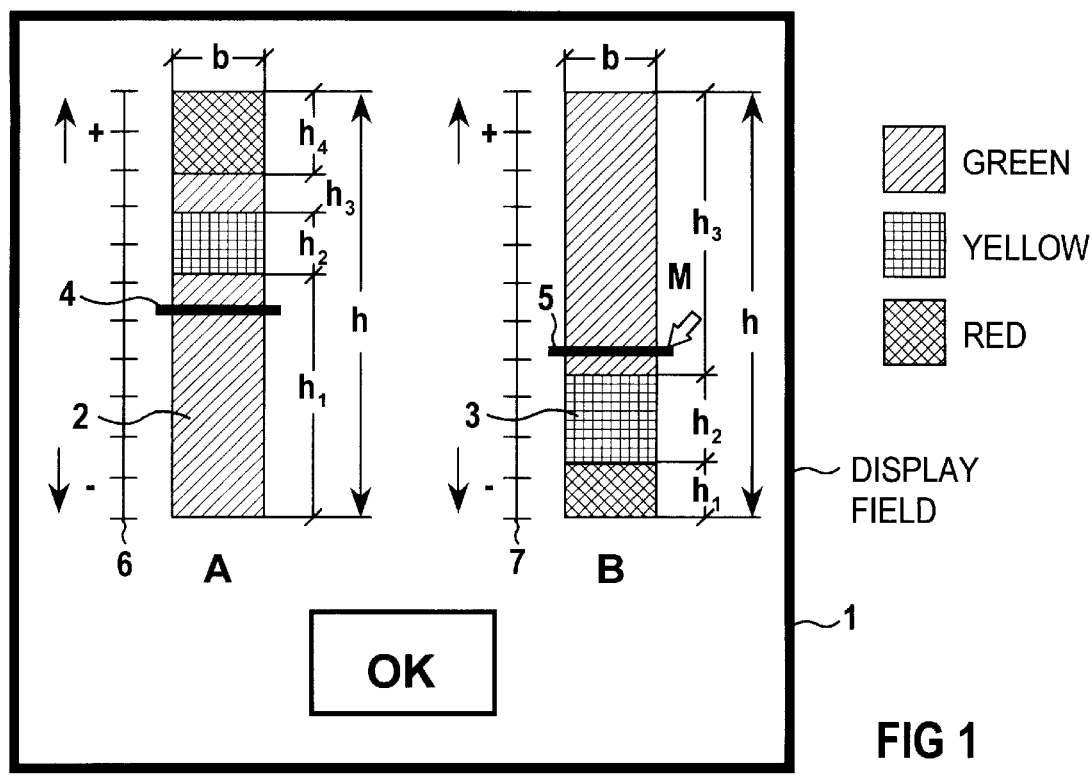
FIG. 1 shows the display field with two scales of an inventive apparatus.
Figure 2:
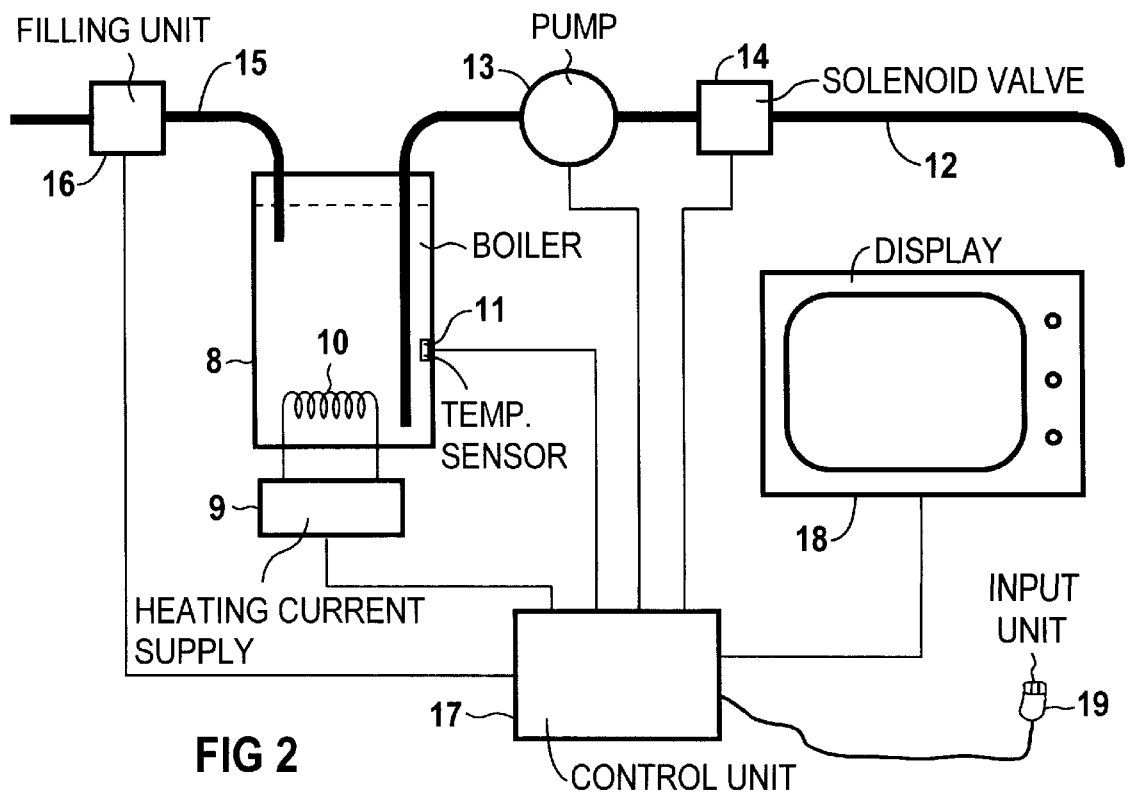
FIG. 2 is a block circuit diagram of an inventive warm water supply.

FIGS. 1 and 2 show the display 1 of an inventive apparatus, having two scales 2, 3 having a bar-shaped form. The scale 2 serves for displaying the operating parameter A of the apparatus; the scale 3 serves for displaying the operating parameter B.

For setting the values of the operating parameters A and B, line-like marks 4 and 5 proceeding transversely to the longitudinal axis of the respective scales 2 and 3, can be displaced with an input means (not shown), for example with a mouse or joystick, in order to be able to set higher or lower values for the respective operating parameters A or B. The direction for setting higher values is respectively identified by an arrow provided with "+" and the direction for setting lower values is respectively identified with an arrow provided with a "−". In FIG. 1, a mouse pointer reference M is indicated that serves for adjusting the marks 3 and 4.

The scales 2 and 3 are respectively divided into a number of colored ranges, the colors of the ranges indicating whether the values for the operating parameter A or B lying in the respective range are admissible (green), conditionally admissible (yellow) or inadmissible (red). Set colors, as can be derived from the legend of FIG. 1, are illustrated by different hatchings in FIG. 1.

The position of the mark 4 of the scale 2 influences the division of the scale 3 into colored ranges; conversely, the position of the mark 5 of the scale 3 influences the division of the scale 2 into colored ranges.

An attendant thus can displace the marks 4 and 5 until both marks are located in a green range of the respective scales 2 and 3 and can then be certain that the set combination of values of operating parameters A and B is permitted. The division into colored ranges on the one scale which occurs dependent on the position of the mark on the other scale cannot be influenced by the attendant. On the contrary, the corresponding dependencies of the division of the one scale into colored ranges on the position of the mark of the other scale is stored in a control unit of the inventive apparatus in a way not illustrated in FIG. 1.

The values of the operating parameters A and B set with the marks 4 and 5 are in fact not immediately set. Rather, operating parameters A and B are only initially pre-selected with the marks 4 and 5 and the pre-selections are only set when a mouse pointer M is placed onto a field of the display means marked "OK" and a mouse click is carried out. The actual setting of the preselected values of the operating parameters A and B also ensues only when the values of both operating parameters are in a permissible or at least conditionally permissible range of the scales 2 and 3. Otherwise, the actual setting of the preselected values of the operating parameters A and B is denied.

The important features of the scales 2 and 3 are the mark that allows an attendant to set a desired value of the corresponding operating parameter, and the division into colored ranges bearing variable dependent on the operating parameters set on one or more other scales. This combination of features indicates to the attendant whether the desired value of the respective operating parameter is permitted or not.

The term "color", moreover, is used herein beyond its narrow (chromatic) sense so that different "colors" can also be different grey-scale values or of different patterns.

The relationship between width b and height h of the scales 2 and 3 and the dimensions of the marks 4 and 5 are not important. It is only important that the colors of the different ranges can be easily distinguished and that the location of the mark 4 or 5, can be easily recognized. Only in this way can the attendant obtain the correct information with a quick look.

The various colors represent the possible system responses of the inventive apparatus to a set combination of values of the operating parameters A and B. Whether a combination is inadmissible or is denied by the apparatus or whether it is admissible can easily be seen. It can also be seen whether a set combination of values of the operating parameters A and B is conditionally admissible, i.e., possible but not optimum.

The heights $h_1$, $h_2$, etc., of the chromatically different ranges represent that value range of the operating parameters A and B in which the respective system response is valid.

In the way shown in FIG. 1, there is also the possibility to provide scalings 6 and 7 by gradations next to the scales 2 and 3 for the quantitative display.

Figure 3:
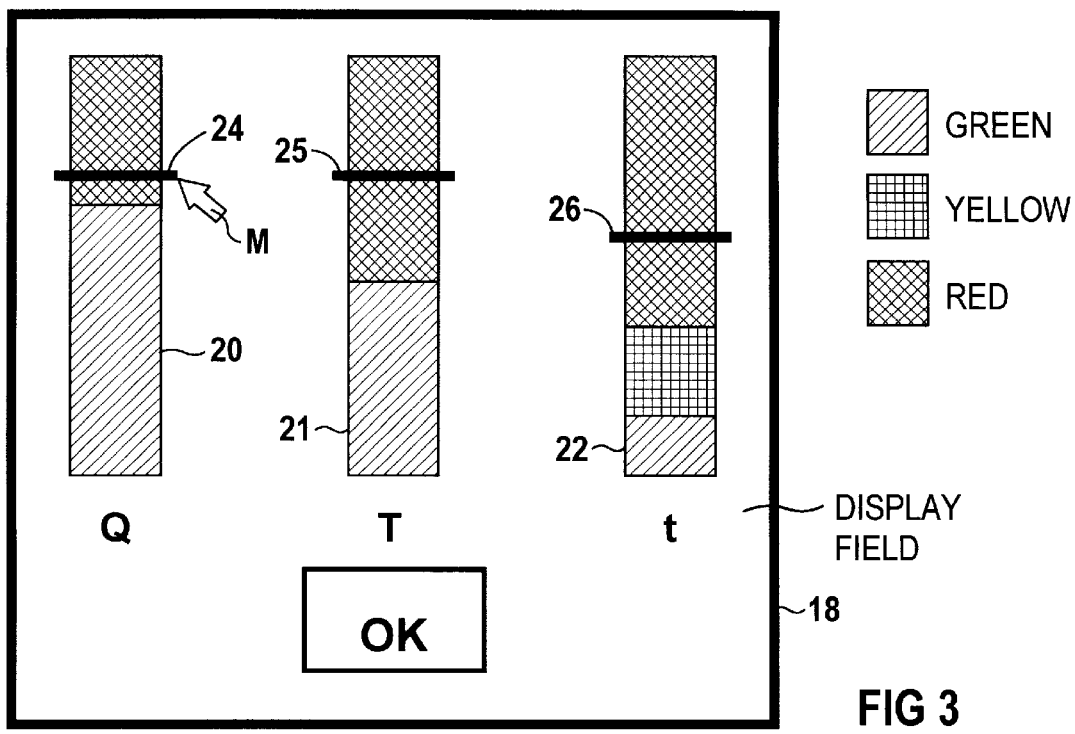
FIGS. 3 and 4 respectively show the display of the warm water supply of FIG. 2 for two different conditions.
Figure 4:
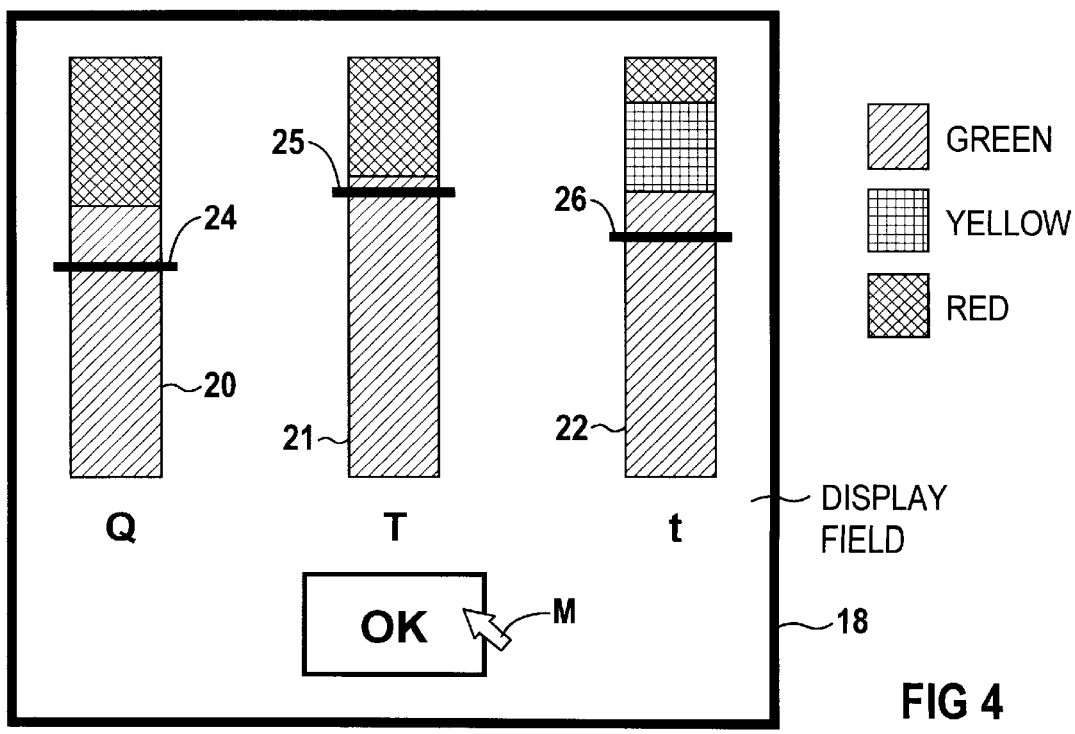

FIGS. 2 through 4 show an inventively fashioned warm water supply system. This includes a boiler 8 filled with water. The water situated in the boiler 8 can be heated with a heating coil 10 connected to an electrical heating current supply 9. A temperature sensor 11 for measuring the water temperature is also provided. Warm water can be taken from the boiler 8 via a conduit 12. To that end, an electromotor operated pump 13 having a variable pumping capacity that is connected into the conduit 12 must be activated and a solenoid valve 14 connected into the conduit 12 must be opened.

When warm water is removed, then the removed water is in turn replenished with a schematically indicated, automatic filling unit 16, so that a substantially constant filling level is always present in the boiler 8.

The heating current supply 9, the temperature sensor 11, the pump 13 and the solenoid valve 14 are connected to a control unit 17 which, for example can be a commercially obtainable personal computer (PC). A display 18, for example a monitor, is connected to the control unit 17, the graphic user interface illustrated in greater detail in FIGS. 3 and 4 being displayed thereon, this being controllable with an input unit 19, for example, a mouse.

As can be seen from FIG. 3, the graphic user interface of the warm water supply system exhibits three scales 20, 21 and 22. A desired volume stream Q (liters/minute) can be set as operating parameter with the mark 24 of the scale 20, i.e. the control unit 17 sets the conveying capacity of the pump 13 such that the volume stream Q set with the mark 24 derives when the solenoid valve 14 is opened. This, however, is all invalid if the mark 24 is located in a range of the scale 20 whose color indicates that the set value is admissible for the volume stream Q.

The scale 21 identifies a further operating parameter, namely the temperature T(°C.) of the water, i.e. the control unit 17 regulates the current supplied to the heating coil 10 by the heating current supply 9 while monitoring the output signal of the temperature sensor 11. It can alternatively regulate the quantity of cold water supplied to the tank such that the warm water taken from the boiler 8 exhibits the temperature set with the mark 25. This is again only true given the pre-condition that the mark 25 is located in a range of the scale 21 whose color indicates that the selected temperature T is permitted.

The scale 22, finally, relates to the operating parameter of the duration of the water delivery (in minutes), i.e. the time for which the control unit 17 of the solenoid valve 14 opens given operating pump 13 is set with the mark 26.

Thus new water is supplied to the boiler 8 given removal of warm water therefrom, and is heated. Due to the limited performance capability of the heating current supply 9 and the heating coil 10, neither an arbitrarily large volume stream Q of warm water having a specific temperature T can be removed, nor can warm water having a specific temperature T be removed over an arbitrarily long time duration t. Only limited combination possibilities of the values of the operating parameters Q, T and t are thus possible.

Whether a combination of values of these operating parameters desired by an attendant is possible can be easily determined by the attendant in that the attendant sets the marks 24, 25 and 26 to the desired values of the operating parameters Q, T and t with the mouse pointer M. The control unit 17 then sets the colored ranges of the scales 20, 21 and 22 that indicate the admissibility, inadmissibility and conditional admissibility of specific values of the operating parameters Q, T and t according to the positions of the marks 24, 25 and 26. This can ensue on the basis of a table stored in the control unit 17 that contains the admissible, inadmissible and conditionally admissible values of the other operating parameters for the adjustable values of each of the operating parameters Q, T and t and dependent on the temperature of the water measured at the moment with the temperature sensor 11.

In the case of the combination of values of the operating parameters Q, T and t illustrated in FIG. 3, all marks 24, 25 and 26 are located in a red range of the corresponding scales 20, 21 and 22. This means that it is not possible to realize a water delivery with the set values of the operating parameters Q, T and t.

The attendant must now decide what operating parameters the attendant wishes to modify in that the corresponding mark is displaced to such an extent in the direction to a permissible range of the corresponding scale until the other marks are likewise located in permissible or at least conditionally permissible ranges of their scales.

In the described exemplary embodiment, the attendant—according to FIG. 4—has reduced the value for the operating parameter Q to such an extent by adjusting the mark 24 on the scale 20 that the control unit 17 indicates a modified division of the colored ranges for the scales 21 and 22, the marks 25 and 26 for the operating parameters T and t are also being located in admissible ranges of the scales 21 and 22. The modified combination of the values of the operating parameters Q, T and t is thus admissible and a corresponding water delivery occurs when the attendant executes a mouse click on the field referenced "OK".

Figure 5:
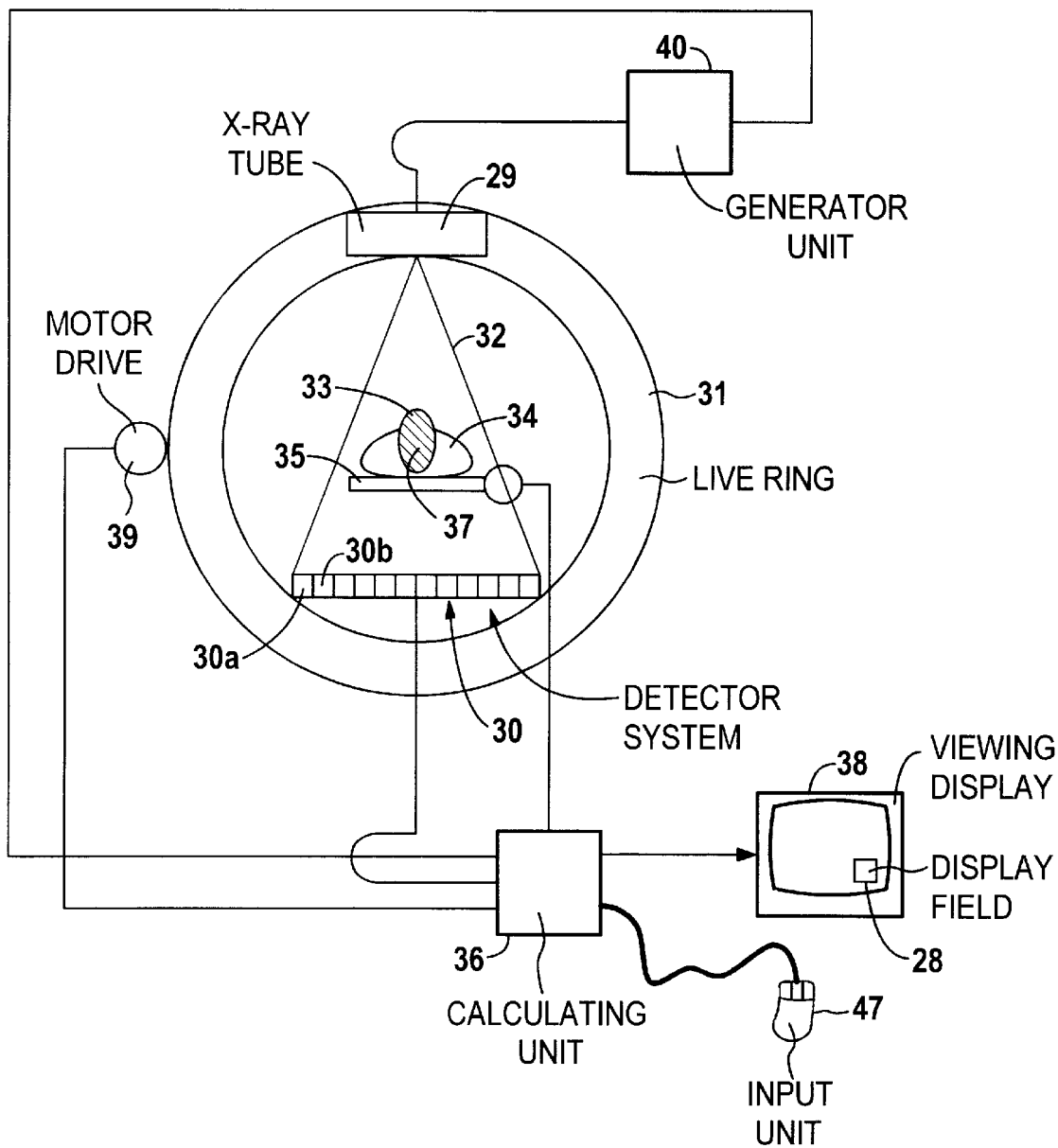
FIG. 5 is a block diagram of a computed tomography apparatus in accordance with the invention.
Figure 6:
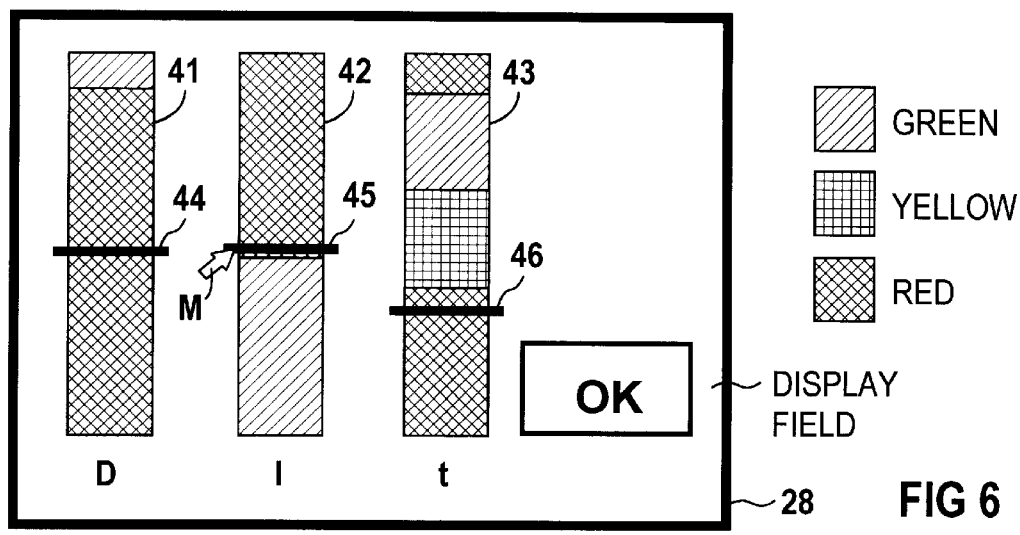
FIGS. 6–8 shows a display of the computed tomography apparatus of FIG. 5 for three conditions.
Figure 7:
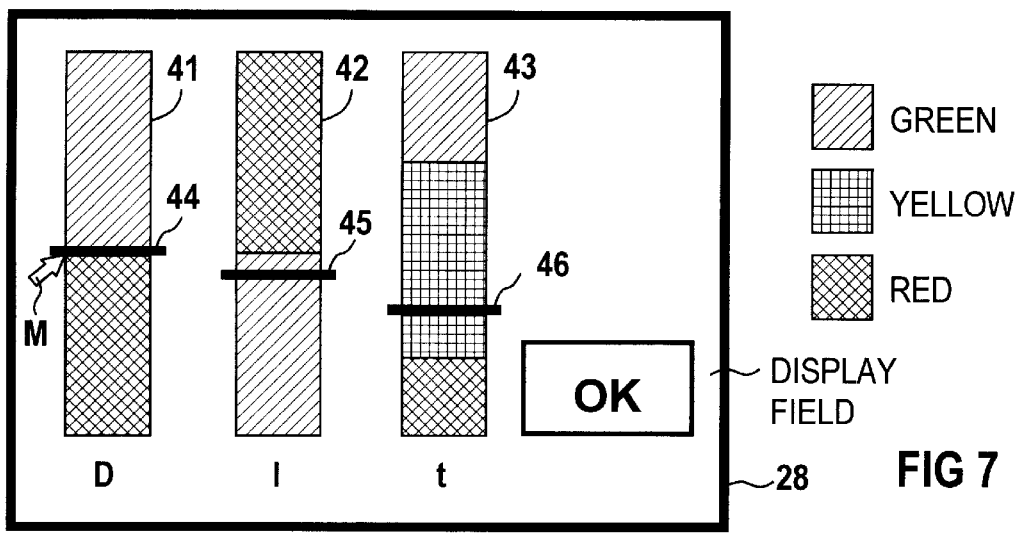

Another inventive apparatus that relates to the control of an x-ray tube in a computed tomography (CT) device is shown in FIGS. 5–7.

According to FIG. 5, the CT apparatus includes an x-ray tube 29 that forms a radiation measuring unit together with a detector system 30. The detector system 30 is formed by a series of individual detectors 30a, 30b etc. The x-ray tube 29 is rigidly connected to the detector system 30 via a live ring 31 and emits a fan-shaped x-ray beam 4 that penetrates a slice 33 of a patient 34 to be examined. The patient 34 lies on a patient bed 35. The number of individual detectors 3a, 3b, etc. of the detector system 30 is selected in conformity with the desired image resolution. Each individual detector 30a, 30b, etc., supplies an electrical signal that corresponds to the intensity of the respectively incident x-radiation.

The individual detectors 30a, 30b, etc., of the detector system 30 are connected to an electronic calculating unit 36.

The output signals of the individual detectors 30a, 30b, etc. are supplied to the control unit 36 during rotation of the radiation measuring unit 29, 30 around a rotational axis 37 that preferably proceeds parallel to the longitudinal direction of the patient bed 35. The control unit 36 calculates the x-ray attenuation values of the volume elements of the slice 33. On the basis of these x-ray attenuation values, the calculating unit 36 calculates a tomogram of the examined slice 33 that can be reproduced on a viewing monitor 30a. A specific x-ray attenuation value has a specific gray-scale value to which it corresponds in the illustration of the tomogram. A set of output signals of the detector system 30 is generated during the rotation of the radiation measuring unit 29, 30 around the rotational axis 36 by acquiring the output signals of the individual detectors 30a, 30b, etc., for example per angular degree. Given, for example, 512 individual detectors in the detector system 30, 360×512 output signals are generated per scan event in this way, and the calculation of the x-ray attenuation values of the volume elements of a slice 33 can be based on these. Given the illustrated exemplary embodiment, however, not all individual detectors but only a very few thereof have been shown, for clarity.

The rotation of the live ring 31 is effected with a motor 39 that is actuated in the required way by the electronic calculating unit 36. The x-ray tube 29 is supplied with the required currents by a generator unit 40. The greater unit 40 is likewise controlled in the required way by the electronic calculating unit 36. For controlling the x-ray tube 29, and possibly, other components of the CT apparatus as well, however, a separate control unit can be provided.

Figure 8:
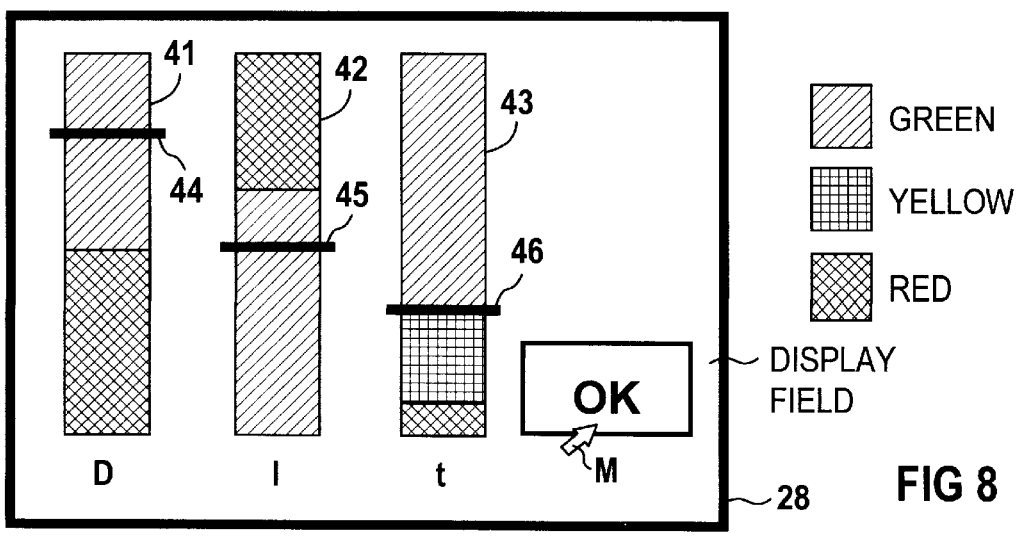

As illustrated in FIGS. 6 through 8, at least a part of a field 28 with three scales 41, 42 and 43 forming a graphic user interlace is additionally provided on a display 38 (a separate display can be potentially provided for this purpose), the marks 44, 45 and 46 thereof allowing operating parameters of the x-ray tube 29 to be set. The selection of these operating parameters influences the image quality and the duration of the examination.

In the described exemplary embodiments, an attendant can modify the following operating parameters with the scales 41 through 43 and the corresponding marks 44 through 46 adjustable with the mouse pointer M of a mouse 47 connected to the calculating means 36:

Waiting time D(s) before the beginning of the exposure,

Tube current I (mA), and

Duration t (s) of the x-radiation.

Attention must be paid to the fact in the selection of these operating parameters that the anode of the x-ray tube 29 exhibits only a limited heat-storing capacity. An arbitrary duration t of the x-radiation given an arbitrary tube current I is therefore not possible at an arbitrary point in time. The duration t of the x-ray emission that is possible at a specific point in time given a specific tube current I results from the starting temperature of the anode of the x-ray tube 29 and, thus, from the heat quantity that the anode of the x-ray tube 29 can still absorb before a maximally allowed anode temperature is reached and, thus, the heat storing capacity of the anode of the x-ray tube 29 has been exhausted. The rating time D before the beginning of the exposure does not always influence the quality of the examination. When, however, a contrast agent is administered, it is important that the exposure occurs at a specific point in time since the contrast agent will otherwise no longer be located in the region of the patient to be examined. Only the physician can determine this point in time. With a longer waiting time D before the beginning of the exposure, the anode of the x-ray tube 29 has a lower starting temperature, for which reason the tube can radiate longer. On the other hand, a longer waiting time D for the beginning of the exposure leads to a longer overall examination time with correspondingly higher costs.

The tube current I has a great influence on the image quality. A higher tube current R means less noise in the image. When the physician wishes to examine smaller structures, he or she is therefore reluctant to forgo a high tube current I and must therefore decide whether he or she wishes to accept a longer waiting time D before an examination or wishes to shorten the duration t of the x-radiation in which the smaller body region is examined. It is generally valid that the duration t of the x-ray emission can be longer than the lower the tube current I is.

There are two limits for the duration t of the x-radiation.

The first limit is the aforementioned heat storing capacity of the anode of the x-ray tube 29. In order to realize a constant image quality, a situation that cannot be intuitively governed by an attendant can therefore arise so that an exposure must be lengthened (given reduced tube current I) in order to be possible at all.

The second limit is highly dependent on the respective patient and on the body region to be examined. When a body region is examined wherein respiration artifacts are to be anticipated (for example thorax, abdomen), the duration t of the x-radiation must not exceed a specific time that is predetermined by how long the patient can hold his breadth. The physician must decide whether a smaller body region should be examined, whether the exposure (possibly with sacrifices in the image quality) should be implemented faster or whether the physician can accept respiration artifacts.

A complex situation is thus present that makes it difficult for an attendant to get an overview. With the assistance of the invention, however, this is easily possible, as FIGS. 6 through 8 show.

FIG. 6 represents an initial situation of values of the operating parameters of waiting time D, tube current I and duration t of the x-radiation that a physician wishes to select for an examination to be implemented.

As FIG. 6 shows, the desired combination of values of the operating parameters is not possible, since all marks 44 through 46 are located in a red range of the scales 41 through 43.

However, the physician can immediately see that a slight lowering of the tube current I would lead to the fact that at least the tube current lies in an admissible range.

When a corresponding lowering of the tube current is undertaken, then the planned examination can in fact be implemented since the mark 44 for the waiting time D is located in a green range of the scale 41 and a mark 46 for the duration t of the x-ray emission is located in a yellow range of the scale 43. Since, however, the mark is located in the yellow, and thus only conditionally possible, range, the physician will increase the waiting time D according to FIG. 8 in case the physician wishes to examine small structures, and the patient must hold his breath during the examination to such an extent that the mark 46 for the duration t of the x-ray emission is also located in a green range of the corresponding scale 43.

Thus the physician, who can now enable the merely pre-selected values of the operating parameters by a mouse click on the field referenced start, can govern an extremely complex operating situation in a simple and reliable way with the assistance of the invention.

The computing unit 36 of the CT apparatus sets the colored ranges of the scales 41, 42 and 43 that indicate the admissibility, inadmissibility and conditioned admissibility of specific values of the operating parameters D, I and t according to the positions of the marks 44, 45 and 46, namely on the basis of a program stored in the computing means 36 that calculates the admissible, inadmissible and conditionally admissible values of the respectively other operating parameters for the set values of each of the operating parameters D, I and t. The computing unit 36 thereby takes data into consideration—which it already monitors for safety reasons—with respect to the temperature of the anode of the x-ray tube 29 or equivalent data, for example with respect to the heat-storing capability of the anode of the x-ray tube 29 that still remains up to a limit value.

The application of the invention is not limited to the technical fields of the described exemplary embodiments. Rather, it can be advantageously utilized anywhere that a number of operating parameters depend on one another and the dependencies are complex, unclear or cannot be intuitively grasped, since operated by the attendant is simple and comfortable. As a result, the probability of serious operating errors can be minimized.

Although modifications and changes may be suggested by those skilled in the art, it is the intention of the inventor to embody within the patent warranted hereon all changes and modifications as reasonably and properly come within the scope of her contribution to the art.

I claim as my invention:

1. An apparatus comprising:

a plurality of apparatus components having a plurality of operating parameters associated therewith;

a user-operated control system connected to said plurality of operating components;

said control system having a display containing a first scale in which a first mark indicates a value of a first of said plurality of operating parameters and a second scale in which a second mark indicates a value of a second of said plurality of operating parameters;

said control system having user-operable input means for allowing a user to displace said first mark within said first scale and to displace said second mark within said second scale;

each of said first and second scales being divided into visually perceptible, adjustable ranges respectively indicating, for a current combination of respective values of said first and second operating parameters, an admissible range and an inadmissible range in said first scale for said first operating parameter and an admissible range and an inadmissible range in said second scale for said second operating parameter; and said control system having control means for automatically adjusting respective sizes of said ranges in said first and second scales dependent on said current combination of values of said first and second operating parameters, for causing said first scale to indicate admissible and inadmissible ranges for said first operating parameter dependent on the value in said current combination of said second operating parameter, and for causing said second scale to indicate admissible and inadmissible ranges for said second operating parameter dependent on the value in said current combination of said first operating parameter.

2. An apparatus as claimed in claim 1 wherein said first scale further contains a visually perceptible, adjustable conditionally admissible range for said first operating parameter and wherein said second scale further contains a visually perceptible, adjustable conditionally admissible range for said second operating parameter, and wherein said control means comprises means for adjusting a size of said conditionally admissible range in said first scale together with the respective sizes of said admissible and inadmissible ranges in said first scale, and for adjusting a size of said conditionally admissible range in said second scale together with the respective sizes of said admissible and inadmissible ranges in said second scale.

3. An apparatus as claimed in claim 2 wherein said display displays said admissible, inadmissible and conditionally admissible ranges in said first scale with respectively different colors and displays said admissible, inadmissible and conditionally admissible ranges in said second scale with the same respectively different colors.

4. An apparatus as claimed in claim 2 wherein said display displays said admissible, inadmissible and conditionally admissible ranges in said first scale with respectively different gray scale values and displays said admissible, inadmissible and conditionally admissible ranges in said second scale with the same respectively different gray scale values.

5. An apparatus as claimed in claim 2 wherein said control means includes a table wherein respective admissible, inadmissible and conditionally admissible values for all of said operating parameters in said plurality of operating parameters are stored dependent on respective values of at least one of said plurality of operating parameters, and wherein said control means comprises means for adjusting the respective sizes of said admissible, inadmissible and conditionally admissible ranges in each of said first and second scales using said table and respective current positions of said first and second marks in said first and second scales.

6. An apparatus as claimed in claim 2 wherein said control means comprises means for calculating admissible, inadmissible and conditionally admissible values for each of said plurality of operating parameters dependent on at least one of the respective values of said first and second operating parameters in said current combination.

7. An apparatus as claimed in claim 6 wherein said plurality of apparatus components has a current status associated therewith, and wherein said control means comprises means for calculating said admissible, inadmissible and conditionally admissible values of each of said operating parameters in said plurality of operating parameters dependent on said at least one respective value of said first and second operating parameters in said current combination and dependent on said current status.

8. An apparatus as claimed in claim 1 wherein said display displays said admissible and inadmissible ranges in said first scale with respectively different colors and displays said admissible and inadmissible ranges in said second scale with the same respectively different colors.

9. An apparatus as claimed in claim 1 wherein said display displays said admissible and inadmissible ranges in said first scale with respectively different gray scale values and displays said admissible and inadmissible ranges in said second scale with the same respectively different gray scale values.

10. An apparatus as claimed in claim 1 wherein said control means includes a table wherein respective admissible and inadmissible values for all of said operating parameters in said plurality of operating parameters are stored dependent on respective values of at least one of said plurality of operating parameters, and wherein said control means comprises means for adjusting the respective sizes of said admissible and inadmissible ranges in each of said first and second scales using said table and respective current positions of said first and second marks in said first and second scales.

11. An apparatus as claimed in claim 1 wherein said control means comprises means for calculating admissible and inadmissible values for each of said plurality of operating parameters dependent on at least one of the respective values of said first and second operating parameters in said current combination.

12. An apparatus as claimed in claim 11 wherein said plurality of apparatus components has a current status associated therewith, and wherein said control means comprises means for calculating said admissible and inadmissible values of each of said operating parameters in said plurality of operating parameters dependent on said at least one respective value of said first and second operating parameters in said current combination and dependent on said current status.

13. An apparatus as claimed in claim 1 wherein said user-operable input means comprises at least one operating element for pre-selecting said value of said first operating parameter and said value of said second operating parameter by adjusting the respective positions of said first and second marks in said first and second scales, and a further operating element for setting said first and second values if neither of said pre-selected values is within an inadmissible range.

14. An apparatus as claimed in claim 1 wherein each of said first and second scales comprises a bar scale.

15. An apparatus as claimed in claim 14 wherein said bar scale comprising said first scale has a longitudinal axis and wherein said first mark comprises a line proceeding transversely to said longitudinal axis of said first scale, and wherein said bar scale comprising said second scale has a longitudinal axis and wherein said second mark comprises a line proceeding transversely to said longitudinal axis of said second scale.

16. An apparatus as claimed in claim 15 wherein at least one of said first and second scales comprises a plurality of visually-perceptible gradations disposed next to said at least one of said scales.

17. An apparatus as claimed in claim 1 wherein said plurality of apparatus components comprise a medical apparatus.

18. An apparatus as claimed in claim 17 wherein one of said apparatus components comprising said medical apparatus is an x-ray tube, and wherein said plurality of operating parameters comprise a waiting time before beginning an x-ray exposure using said x-ray tube, a tube current of said x-ray tube, a mAs product of said x-ray tube, and a duration of emission of x-rays from said x-ray tube.

19. An apparatus as claimed in claim 17 wherein said medical apparatus comprises a computed tomography apparatus.

20. An apparatus as claimed in claim 17 wherein said medical apparatus comprises an x-ray angiography apparatus.

* * * * *